(12) United States Patent
Wang et al.

(10) Patent No.: US 11,520,145 B2
(45) Date of Patent: Dec. 6, 2022

(54) VISUAL OVERLAY OF DISTANCE INFORMATION IN VIDEO FEED

(71) Applicant: Lenovo (Singapore) Pte. Ltd., Singapore (SG)

(72) Inventors: Song Wang, Cary, NC (US); Mengnan Wang, Chapel Hill, NC (US); Barrett James Bryson, Raleigh, NC (US); Zhenyu Yang, Dayton, OH (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/835,989

(22) Filed: Mar. 31, 2020

(65) Prior Publication Data

US 2021/0302735 A1 Sep. 30, 2021

(51) Int. Cl.
| | |
|---|---|
| *H04N 13/183* | (2018.01) |
| *G02B 27/01* | (2006.01) |
| *G02B 27/00* | (2006.01) |
| *H04N 13/178* | (2018.01) |

(52) U.S. Cl.
CPC ..... *G02B 27/0172* (2013.01); *G02B 27/0093* (2013.01); *H04N 13/178* (2018.05); *H04N 13/183* (2018.05); *G02B 2027/014* (2013.01); *G02B 2027/0138* (2013.01)

(58) Field of Classification Search
CPC ............ G02B 27/0172; G02B 27/0093; G02B 2027/0138; G02B 2027/014; H04N 13/178; H04N 13/183
See application file for complete search history.

(56) References Cited

U.S. PATENT DOCUMENTS

| | | | |
|---|---|---|---|
| 10,318,907 B1* | 6/2019 | Bergstrom | G06K 9/00664 |
| 2002/0010734 A1* | 1/2002 | Ebersole | H04L 67/36 709/201 |
| 2012/0113109 A1* | 5/2012 | Lee | G06F 16/583 345/419 |
| 2015/0241172 A1* | 8/2015 | Roman | F41G 3/165 235/404 |
| 2017/0213387 A1* | 7/2017 | Bean | G06F 3/012 |
| 2019/0293609 A1* | 9/2019 | Oh | G01S 15/86 |
| 2020/0314356 A1* | 10/2020 | Storer | G06F 16/735 |
| 2021/0248371 A1* | 8/2021 | Carter | G06T 15/205 |

* cited by examiner

*Primary Examiner* — James T Boylan
(74) *Attorney, Agent, or Firm* — Ference & Associates LLC

(57) ABSTRACT

One embodiment provides a method, including: initiating, using at least one camera of an information handling device, a video feed; receiving marking input on an object in the video feed; identifying, using at least one distance sensor of the information handling device, distance information from the information handling device to the object; and providing, in the video feed and presented concurrently with the marking input, a visual overlay of the distance information. Other aspects are described and claimed.

10 Claims, 3 Drawing Sheets

VISUAL OVERLAY OF DISTANCE INFORMATION IN VIDEO FEED

BACKGROUND

As technology has advanced, innovative techniques have been developed that enable users of information handling devices ("devices"), for example smart phones, tablets, head-mounted displays ("HMDs"), and the like, to receive remote assistance for various matters. More particularly, technicians may be able to remotely access the user's device from another device (e.g., during a troubleshooting session, etc.). Such an ability may enable a technician to see and/or control what a user is seeing on their device's display screen (e.g., an application window, a particular user interface, video content recorded by a camera, etc.)

BRIEF SUMMARY

In summary, one aspect provides a method, comprising: initiating, using at least one camera of an information handling device, a video feed; receiving marking input on an object in the video feed; identifying, using at least one distance sensor of the information handling device, distance information from the information handling device to the object; and providing, in the video feed and presented concurrently with the marking input, a visual overlay of the distance information.

Another aspect provides an information handling device, comprising: at least one camera; at least one distance sensor; a processor; a memory device that stores instructions executable by the processor to: initiate a video feed; receive marking input on an object in the video feed; identify distance information from the information handling device to the object; and provide, in the video feed and presented concurrently with the marking input, a visual overlay of the distance information.

A further aspect provides a product, comprising: a storage device that stores code, the code being executable by a processor and comprising: code that initiates a video feed on an information handling device; code that receives marking input on an object in the video feed; code that identifies distance information between the information handling device and the object; and code that provides, in the video feed and presented concurrently with the marking input, a visual overlay of the distance information.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
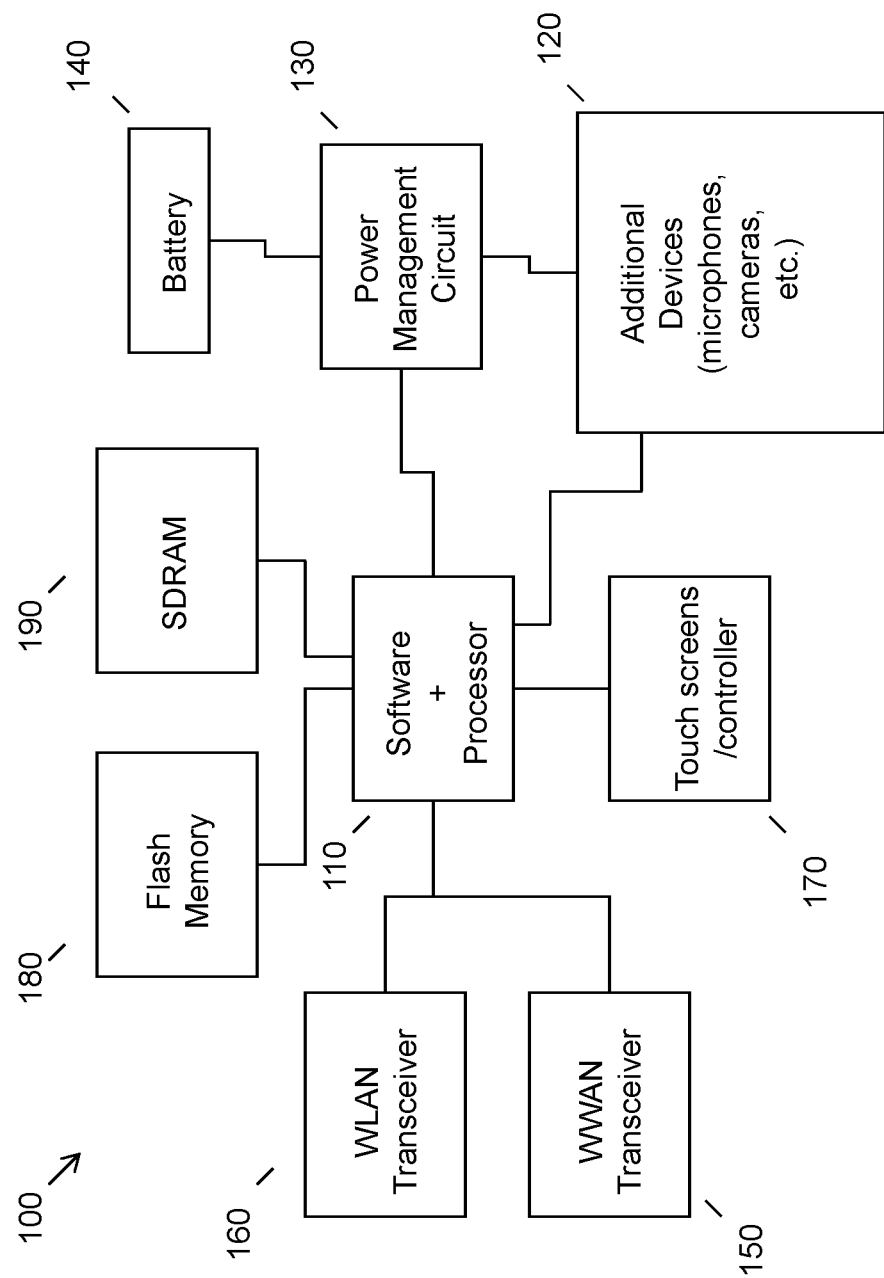
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Remote support sessions typically consist of a video and/or audio session between the user's device and at least one other device controlled by a customer support representative or technician. These sessions enable support staff to visualize and/or control what a user is seeing on a display screen of their device. For example, support staff may create drawings or provide marking input that all parties can view in real time. Such features are helpful when support staff want to highlight something on the user's display (e.g., a particular object that is being captured by a camera of the user's device, etc.).

Currently, remote sessions are not optimized with distance information. More particularly, current systems do not provide an indication of a distance between the user's device and one or more objects that may be present in a field of view of the user's camera. This lack of distance information may make it difficult for support staff to determine how close or far a target object is relative to the user, which may be useful information to know in certain situations. Additionally, there are no solutions available that enable the user or support staff to perform a distance-based search. For example, no solutions currently exist that enable a user to provide a query that contains a distance attribute such "how many computers do I see that are 5 meters away from me?"

Accordingly, an embodiment provides a novel method for providing a visual overlay of distance information in a video feed. In an embodiment, a device may initiate a video feed by using an integrated or operatively coupled camera. This video feed may be accessible by at least one other device (e.g., a device belonging to a technician, etc.). An embodiment may then receive marking input on an object present in the video feed. The marking input may take a variety of different forms (e.g., a circling of the object, the placement of an X above the object, etc.) and may be provided by the user or another individual that has access to the video feed. An embodiment may also identify distance information from the user's device to the object (e.g., using a distance sensor, etc.). With this information in hand, an embodiment may thereafter provide a visual overlay of the distance information. More particularly, the distance information may be presented concurrently with the marking input and may also be visible to the other individual that has access to the video feed. Additionally, an embodiment may be able to save one or more frames associated with the visual overlay (e.g., in an accessible database, etc.) and may thereafter be able to produce these frames, or a response based upon data in these frames, in response to a distance-based search query. Such a method may therefore provide another layer of information that can prove useful during remote troubleshooting sessions.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
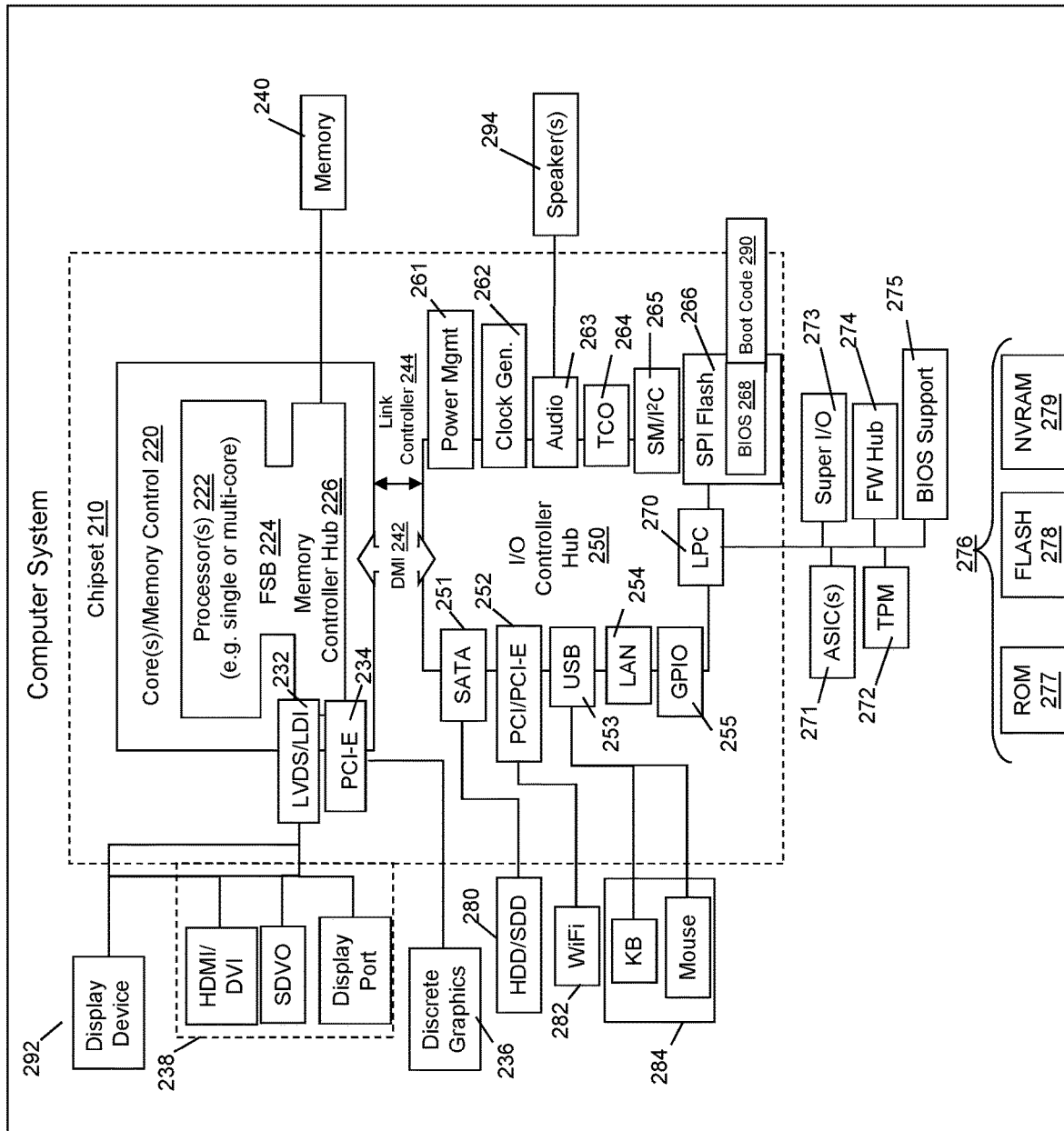
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in augmented reality devices that are capable of capturing an image or video of a scene and sharing that image or video with another device in substantially real time. For example, the circuitry outlined in FIG. 1 may be implemented in a smart phone or tablet embodiment, whereas the circuitry outlined in FIG. 2 may be implemented in another type of mobile computer system (e.g., head-mounted display, etc.).

Figure 3:
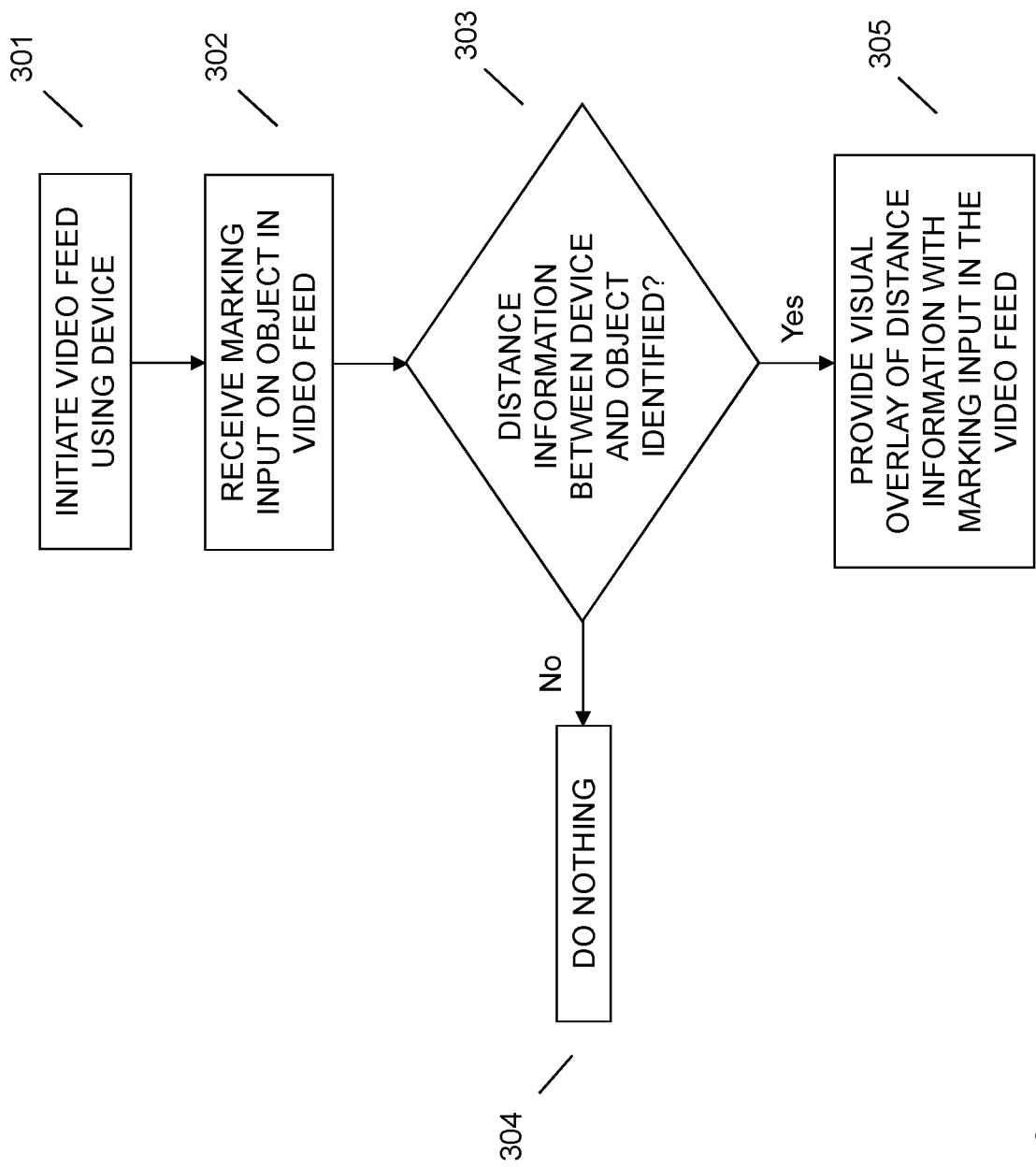
FIG. 3 illustrates an example method of providing a visual overlay of distance information in a video feed.

Referring now to FIG. 3, an embodiment provides a method for providing a visual overlay of distance information in a video feed. At 301, an embodiment may initiate a video feed from a device. The device may be virtually any device having augmented reality capabilities (i.e., software and/or hardware that enable the display and/or manipulation of augmented reality objects on a display screen of the device). For simplicity purposes, the remaining discussion will be described with reference to an augmented capable head-mounted display ("HMD") as the device. It is important to note that such a designation is not limiting and that other devices (e.g., smart phones, tablets, etc.) that also contain augmented reality capabilities may also be compatible with the teachings and concepts described herein.

In an embodiment, the video feed may be initiated in response to a user command or may be initiated in response to a predetermined event (e.g., responsive to initialization of the HMD, responsive to activation of a particular application, etc.). An embodiment may facilitate video capture via at least one camera sensor that is integrally or operatively coupled to the HMD.

At 302, an embodiment may receive marking input on an object in the video feed. In an embodiment, the marking input may be provided by the user or, alternatively, may be provided by another individual that has access to the video feed. For example, the marking input may be provided by a support technician that is accessing the video feed from their own device. In an embodiment, the marking input may be virtually any input that provides an indication to a system that an object present in the video feed has been marked or selected. For example, the marking input may correspond to a circling of an object of interest, a highlighting of an object of interest, a double tapping over top of an object of interest, and the like. As another example, the marking input may be an identification that is known to the system but may be substantially invisible to the user. More particularly, the system may record selection inputs for various objects but these selections may not be visible to the user.

Additionally or alternatively to the foregoing, the marking input may correspond to a user command to mark all objects of a certain type. For example, a support technician may provide the voice command "highlight all digital assistant devices". Responsive to receiving this command, an embodiment may analyze the video, determine the identity of the objects within the video feed (e.g., using one or more conventional object identification techniques, etc.), and thereafter dynamically mark any object that is determined to be a digital assistant device.

At 303, an embodiment may identify distance information from the HMD to the marked object. In this regard, an embodiment may identify the distance between the HMD and the marked object. The distance may be identified by using a distance sensor such as a time-of-flight (ToF) sensor. In an embodiment, distance information may be calculated at predetermined time intervals (e.g., every second, every 10 seconds, every minute, etc.) or may be calculated responsive to the detection of one or more predetermined events (e.g., responsive to detection of received marking input, responsive to a user command to calculate distance, responsive to detection of user device movement, responsive to detection of a new object entering a field of view of the camera, etc.). In an embodiment, distance information may be calculated by the system for each identified object in the field of view of the camera. This information may thereafter be retrieved and displayed when a particular object is marked, as further described below.

Responsive to not identifying, at 303, distance information associated with the marked object, an embodiment may, at 304, take no additional action. Conversely, responsive to identifying, at 303, distance information for the marked object, an embodiment may, at 305, provide a visual overlay of the distance information on the user's display screen.

In an embodiment, the visual overlay of the distance information may be presented concurrently on the display screen with the marking input. The distance information may be represented by any distance metric a user deems is appropriate for a given situation. An embodiment may initially represent the distance information using a default distance metric (e.g., feet, meters, etc.), which may thereafter be adjusted by a user to another distance metric that better suits their needs. As briefly mentioned above, distance information for one or more objects in a video feed may be dynamically determined by a system but may only be presented in the visual overlay when those objects are marked. In an embodiment, the distant information presented in the live video feed may dynamically change as the user and/or the user's device's position changes (e.g., as a result of ambulatory movements around a space, etc.).

In an embodiment, one or more frames containing the visual overlay of the distance information may be recorded and saved in a database (e.g., supported locally on the device or supported remotely on another device or server, etc.). An embodiment may be configured to store the frames automatically or, alternatively, may be configured to store the frames responsive to receiving a user command to store. Such an embodiment reduces the impact on device storage space by negating the conventional need to store an entire recording of the video feed.

In an embodiment, a user query may be received that contains a distance attribute. For example, a user may provide the query "how many desktop computers do I see that are within five meters from me". In such a situation, a marking command, as described above, may be integrated within the user query itself. More particularly, the marking command here may first provide an indication to the system to identify the target objects to be marked (i.e., desktop computers) and may then trigger retrieval of distance information associated with these marked objects. Thereafter, an embodiment may filter out the marked objects that are not consistent with the designated distance attribute in the query (i.e., those computer devices that are further than five meters away from user's device) and may then provide a visual overlay of distance information for the remaining marked objects.

In an embodiment, the distance-based user query may be utilized to filter search results. For instance, a user may query a system to "show all stored frames in which digital assistant devices were approximately 3 meters away from me". Responsive to receipt of this query, an embodiment may sort through a collection of stored frames and identify those in which: A) digital assistant devices were marked; and B) those digital assistant devices were determined to be within 3 meters from the user.

The various embodiments described herein thus represent a technical improvement to conventional methods for providing a visual overlay of distance information on a video feed. Using the techniques described herein, an embodiment may initiate a video by using a camera of a device. An embodiment may then receive marking input on one or more objects present in the video feed and thereafter identify distance information from the user's device to the marked object(s). A visual overlay may subsequently be provided on the video feed that contains the distance information displayed concurrently with the marking input. Such a method may optimize the amount of information conveyed and made accessible in remote support sessions.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   initiating, using at least one camera of an information handling device operated by a user, a live video feed;
   enabling another user, operating a remote device, access to the live video feed;
   receiving, at the information handling device and from the another user, a query comprising an identification request of one or more objects in the video feed positioned a predetermined distance away from the information handling device, wherein the predetermined distance represents an upper limit of distance of the one or more objects from the information handling device;
   identifying, using an image analysis technique, the one or more objects specified by the identification request, wherein the identifying comprises dynamically marking the one or more objects, wherein the marking comprises receiving a marking input on the one or more objects within the live video feed in which the marking input highlights the one or more objects of a certain type, wherein the dynamic marking identifies all objects of the certain type;
   identifying, using at least one distance sensor of the information handling device, distance information from the information handling device to the one or more objects, wherein the identifying is responsive to detection of a new object of the certain type entering a field of view of the camera;
   filtering out, based on the distance information, the one or more objects outside of the predetermined distance, wherein the filtering comprises dynamically changes the distance information based upon an ambulatory movement of the user;
   providing, subsequent to the filtering and on a display associated with the information handling device, a visual overlay on the live video feed comprising an indication of the distance information for the one or more objects within the predetermined distance and the marking input of the one or more objects;
   storing, in an accessible database, a frame of the video feed containing the visual overlay, wherein the storing retains the frame responsive to the identification request of one or more objects within the upper limit of distance;
   receiving, at the information handling device, another query input associated with the one or more objects, wherein the another query input comprises a distance attribute corresponding to the predetermined distance;
   retrieving, based on the another query input, the stored frame containing the visual overlay with the marking input and the distance information.

2. The method of claim 1, wherein the information handling device is an augmented reality capable device.

3. The method of claim 1, wherein the at least one distance sensor is a time-of-flight (ToF) sensor.

4. The method of claim 1, wherein the information handling device is a mobile device selected from the group consisting of: a user wearable headset, a smart phone, and a tablet.

5. The method of claim 1, further comprising updating, in the visual overlay, the distance information responsive to detecting a change in a distance between the information handling device and the object.

6. An information handling device, comprising:
at least one camera;
at least one distance sensor;
a processor;
a memory device that stores instructions executable by the processor to:
initiate a live video feed;
enable another user, operating a remote device, access to the live video feed;
receive, from the another user, a query comprising an identification request of one or more objects in the video feed positioned a predetermined distance away from the information handling device, wherein the predetermined distance represents an upper limit of distance of the one or more objects from the information handling device;
identify, using an image analysis technique, the one or more objects specified by the identification request, wherein the identifying comprises marking the one or more objects, wherein the marking comprises receiving a marking input on the one or more objects within the live video feed in which the marking input highlights the one or more objects of a certain type, wherein the dynamic marking identifies all objects of the certain type;
identify distance information from the information handling device to the one or more objects, wherein the identifying is responsive to detection of a new object of the certain type entering a field of view of the camera;
filter out, based on the distance information, the one or more objects outside of the predetermined distance, wherein the filtering comprises dynamically changes the distance information based upon an ambulatory movement of the user;
provide, subsequent to the filtering and on the display, a visual overlay on the live video feed comprising an indication of the distance information for the one or more objects within the predetermined distance and the marking input of the one or more objects;
store, in an accessible database, a frame of the video feed containing the visual overlay, wherein the storing retains the frame responsive to the identification request of one or more objects within the upper limit of distance;
receive, at the information handling device, another query input associated with the one or more objects, wherein the another query input comprises a distance attribute corresponding to the predetermined distance; and
retrieve, based on the another query input, the stored frame containing the visual overlay with the marking input and the distance information.

7. The information handling device of claim 6, wherein the information handling device is an augmented reality capable device.

8. The information handling device of claim 6, wherein the information handling device is a mobile device selected from the group consisting of: a user wearable headset, a smart phone, and a tablet.

9. The information handling device of claim 6, wherein the instructions are further executable by the processor to update, in the visual overlay, the distance information responsive to detecting a change in a distance between the information handling device and the object.

10. A product, comprising:
a storage device that stores code, the code being executable by a processor and comprising:
code that initiates a video feed on an information handling device operated by a user;
code that enables another user, operating a remote device, access to the live video feed;
code that receives, from the another user, a query comprising an identification request of one or more objects in the video feed positioned a predetermined distance away from the information handling device, wherein the predetermined distance represents an upper limit of distance of the one or more objects from the information handling device;
code that identifies, using an image analysis technique, the one or more objects specified by the identification request, wherein the identifying comprises marking the one or more objects, wherein the marking comprises receiving a marking input on the one or more objects within the live video feed in which the marking input highlights the one or more objects of a certain type, wherein the dynamic marking identifies all objects of the certain type;
code that identifies distance information from the information handling device to the one or more objects, wherein the identifying is responsive to detection of a new object of the certain type entering a field of view of the camera;
code that filters out, based on the distance information, the one or more objects outside of the predetermined distance, wherein the filtering comprises dynamically changes the distance information based upon an ambulatory movement of the user;
code that provides, subsequent to the code that filters, a visual overlay on the live video feed comprising an indication of the distance information of the one or more objects within the predetermined distance and the marking input of the one or more objects;
code that stores, in an accessible database, a frame of the video feed containing the visual overlay, wherein the storing retains the frame responsive to the identification request of one or more objects within the upper limit of distance;
code that receives, at the information handling device, another query input associated with the one or more objects, wherein the another query input comprises a distance attribute corresponding to the predetermined distance; and
code that retrieves, based on the another query input, the stored frame containing the visual overlay with the marking input and the distance information.

* * * * *